United States Patent
Gudorf

(10) Patent No.: US 8,024,419 B2
(45) Date of Patent: Sep. 20, 2011

(54) METHOD AND SYSTEM FOR REMOTE ACCESS OF PERSONAL MUSIC

(75) Inventor: Gregory D. Gudorf, San Diego, CA (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 2528 days.

(21) Appl. No.: 09/785,094

(22) Filed: Feb. 16, 2001

(65) Prior Publication Data

US 2002/0116082 A1    Aug. 22, 2002

Related U.S. Application Data

(60) Provisional application No. 60/203,684, filed on May 12, 2000.

(51) Int. Cl.
    *G06F 15/16* (2006.01)
(52) U.S. Cl. ............................................. 709/217
(58) Field of Classification Search .......... 709/211–219, 709/223
    See application file for complete search history.

(56) References Cited

U.S. PATENT DOCUMENTS

| | | | | |
|---|---|---|---|---|
| 5,428,606 | A | 6/1995 | Moskowitz | 370/60 |
| 5,751,672 | A | 5/1998 | Yankowski | 369/30 |
| 5,841,424 | A | 11/1998 | Kikinis | 345/168 |
| 5,860,068 | A | 1/1999 | Cook | 705/26 |
| 5,864,868 | A | 1/1999 | Contois | 707/104 |
| 5,900,564 | A | 5/1999 | Kurakake | 84/477 R |
| 5,930,768 | A | 7/1999 | Hooban | 705/27 |
| 5,931,901 | A | 8/1999 | Wolfe et al. | 709/206 |
| 5,953,005 | A * | 9/1999 | Liu | 715/500.1 |
| 5,959,945 | A | 9/1999 | Kleiman | 369/30 |
| 5,969,283 | A | 10/1999 | Looney et al. | 84/609 |
| 5,986,200 | A | 11/1999 | Curtin | 84/609 |
| 6,182,045 | B1 * | 1/2001 | Kredo et al. | 704/270 |
| 6,199,082 | B1 * | 3/2001 | Ferrel et al. | 715/522 |
| 6,493,672 | B2 * | 12/2002 | D'Agosto et al. | 704/270.1 |
| 6,546,421 | B1 * | 4/2003 | Wynblatt et al. | 709/225 |
| 6,574,377 | B1 * | 6/2003 | Cahill et al. | 382/305 |
| 6,609,105 | B2 * | 8/2003 | Van Zoest et al. | 705/14 |
| 6,789,954 | B2 * | 9/2004 | Lampert et al. | 385/78 |
| 6,816,703 | B1 * | 11/2004 | Wood et al. | 455/3.04 |
| 2004/0128514 | A1 * | 7/2004 | Rhoads | 713/176 |
| 2005/0013462 | A1 * | 1/2005 | Rhoads | 382/100 |
| 2009/0228336 | A1 * | 9/2009 | Giordano et al. | 705/10 |

OTHER PUBLICATIONS

*Never Lug Your CDs Around Town Again!*, www.my.mp3.com, (Copyright date 1996-2000) (1 page).
*Add Your CDs*, www.my.mp3.com, (Copyright 1996-2000) (2 pages).
RIAA vs. MP3.com, http://www.mp3.com/news/533.html, (dated Jan. 21, 2000) (7 pages).

* cited by examiner

*Primary Examiner* — Hussein A Elchanti
(74) *Attorney, Agent, or Firm* — Lerner, David, Littenberg, Krumholz & Mentlik, LLP

(57) ABSTRACT

In one aspect of the invention, a method is provided for storing audio files. The method includes: (a) receiving electronic files at a central location from a first device, those electronic files representing audio signals; (b) associating the audio files with identification information; (c) storing the audio files at the central location on at least a portion of a storage media, that portion being uniquely associated with the identification information; (d) receiving the identification information from a second device; and (e) transmitting the audio files to the second device upon receipt of the identification information.

54 Claims, 7 Drawing Sheets

| UserID | User Files | | | Device Identifiers | | | |
|---|---|---|---|---|---|---|---|
| | 612 | 614 | | 616 | | | |
| User1 | "File1" (SongA) | "File2" (SongB) | "File3" (SongC) | Device1 (Walkman brand player) | Device2 (Car) | Device3 (PC) | Device4 (Clie brand PDA) |
| User2 | "File4" (SongA) | | | Device5 (Walkman brand player) | | | |
| User3 | "File5" (SongD) | "File6" (SongE) | "File7" (SongA) | Device6 (Walkman brand player) | Device7 (PDA) | | |

FIG. 6

| DeviceID | User Files | Copies Left: |
|---|---|---|
| Device1 | "File1" (SongA) | 5 |
| Device2 | "File4" (SongA) | 3 |
| Device3 | "File5" (SongD) | unlimited |

FIG. 7

| UserID | User Files | | | Device Identifiers | | | |
|---|---|---|---|---|---|---|---|
| User1 | "File1" (SongA) | "File2" (SongB) | "File3" (SongC) | Device1 (Walkman brand player) | Device2 (Car) | Device3 (PC) | Device4 (Clie brand PDA) |
| User2 | "File4" (SongA) | | | Device5 (Walkman brand player) | | | |
| User3 | "File5" (SongD) | "File6" (SongE) | "File7" (SongA) | Device6 (Walkman brand player) | Device7 (PDA) | | | ated with the requested song file; and transmitting the song file in response to the request depending upon the outcome of the step of comparing.

METHOD AND SYSTEM FOR REMOTE ACCESS OF PERSONAL MUSIC

The present application claims the benefit of U.S. Provisional Application No. 60/203,684, filed on May 12, 2000, which is hereby incorporated by reference.

BACKGROUND OF THE INVENTION

Many consumers today have amassed substantial music collections in the CD audio format. The physical aspect of such a large collection however means that a consumer wishing to enjoy their collection from any place other than where the collection is located must make a choice as to which CD to take with them as they move about.

The primary alternative to date has been for the consumer to record select CD's onto cassette tape or mini-disc mediums to take with them when they leave the vicinity of their music collection. By default, this means the entire collection is not remotely available for the consumer's enjoyment.

As a newer alternative, the advent of the MPEG-based MP3 file format has enabled consumers to record (rip) their CD's and store them as MP3 files on their personal computers. This does enable a degree of added flexibility, however as the number of files is limited by the available hard disk drive space in the consumer's PC, it is also an inadequate solution. Since a typical album requires approximately 30-60 mb of hard disk space, the storage requirement of this and similar file formats once again forces the consumer to choose which elements of their music collection they want to enjoy instead of having access to the entire collection.

There is thus a need for a system which allows users both mass storage and portability.

SUMMARY OF THE INVENTION

The present invention meets those needs.

In one aspect of the invention, a method is provided for storing audio files. The method includes (a) receiving electronic files at a central location from a first device, those electronic files representing audio signals; (b) associating the audio files with identification information; (c) storing the audio files at the central location on at least a portion of a storage media, that portion being uniquely associated with the identification information; (d) receiving the identification information from a second device; and (e) transmitting the audio files to the second device upon receipt of the identification information.

In another aspect of the invention, a system is provided for storing and transmitting audio information. It includes a processor, memory, data stored in the memory and instructions executable by the processor. The data identifies a plurality of users or devices and also includes a plurality of files associated with audio information. Each of the files is uniquely associated with the identity of a single user or device. The set of instructions also conditions the transmission of a song from the system to a user or device based on the identity of the user or device associated with the audio information.

In yet another aspect, a method of storing and transmitting songs includes: uniquely associating a portion of the storage space on a server with a user or device; associating the portion with a first identifier; receiving the first identifier; receiving a song file representative of a song; storing the song file in the portion of the storage space associated with the first identifier; receiving a second identifier and a request for the song file; comparing the second identifier with the identifier associated with the requested song file; and transmitting the song file in response to the request depending upon the outcome of the step of comparing.

BRIEF DESCRIPTION OF THE DRAWINGS

FIG. 6 is a functional diagram of device information data stored in a content server in accordance with an embodiment of the invention.

FIG. 7 is a functional diagram of a user storage area in accordance with an embodiment of the invention.

DETAILED DESCRIPTION OF THE PREFERRED EMBODIMENTS

Figure 1:
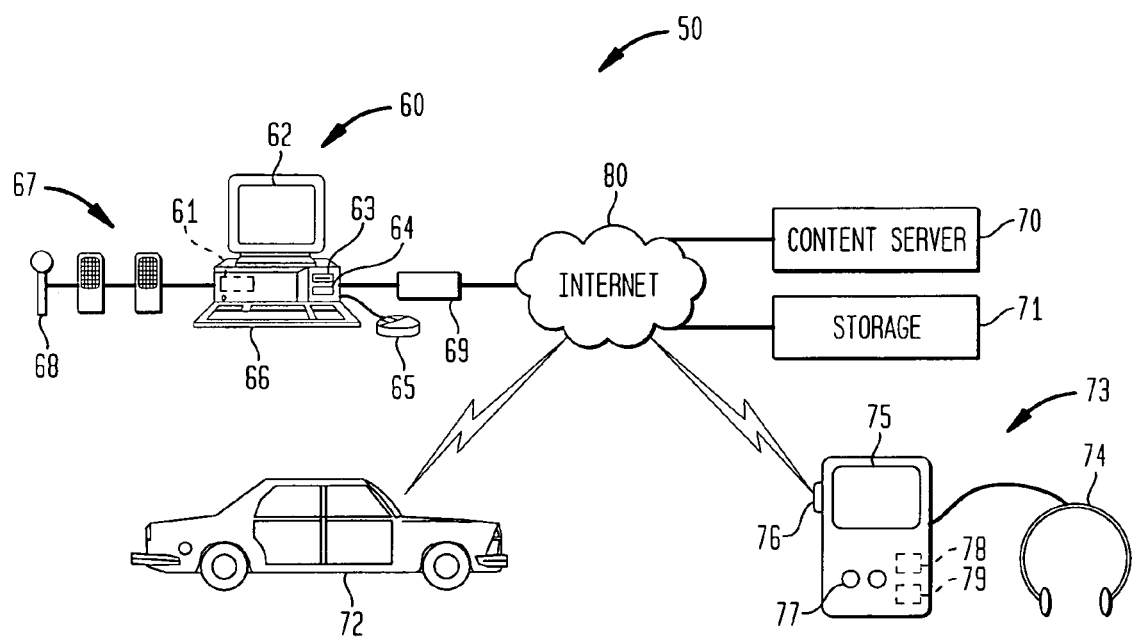
FIG. 1 is a functional diagram of a system in accordance with an embodiment of the invention.

As shown in FIG. 1, a system 50 in accordance with one embodiment of the invention comprises a network of devices such as end user personal computer 60, web servers 70-71, PDA 73 and car-audio system 72, all of which communicate via Internet 80. Although only a few devices are depicted in FIG. 1, it should be appreciated that a typical system can include a large number of connected devices. Preferably, end user computer 60 is a general purpose computer having all the internal components normally found in a personal computer such as, for example, central processing unit (CPU) 61, display 62, CD-ROM 63, hard-drive 64, mouse 65, keyboard 66, speakers 67, microphone 68, modem 69 and all of the components used for connecting these elements to one another. End user computer 60 communicates with the Internet 80 via modem 69. End user computer 60 may comprise any workstation capable of processing instructions and transmitting data to and from humans and other computers, including network computers lacking local storage capability.

Also connected to network 80 is a personal digital assistant (PDA) with wireless capability having all the internal components normally found in a PDA such as, for example, a processor 78, touch-sensitive display 75, buttons 77, modem 76 and all of the components used for connecting these elements to one another. The buttons 77 and touch-sensitive display 75 are typically used for data entry. The PDA also includes a headphone jack for use with headphones 74. The processor executes instructions stored on a storage medium, such as RAM 79. Although a PDA is shown by way of example in this embodiment of the present invention, it should be understood that the PDA may also comprise other mobile devices, such as Internet-capable wireless phones.

Car audio system 72 also communicates with Internet 80 via a wireless communication. The car audio system includes a receiver (not shown) for receiving electronic information over the Internet and a speaker (not shown) for playing the audio signals contained in the audio information.

Web server 70 contains hardware for sending and receiving information over the World Wide Web, such as web pages or files. The web server 70 may be a typical web server or any computer network server or other automated system capable of communicating with other computers over a network, including the Internet, wide area networks or local area networks. For example, the system described above in connection with end user computer 60 may also function as a web server.

Moreover, the system is not limited to the World Wide Web or the Internet but, rather, is applicable to any network allowing remote communication to a central storage area by multiple devices.

Figure 2:
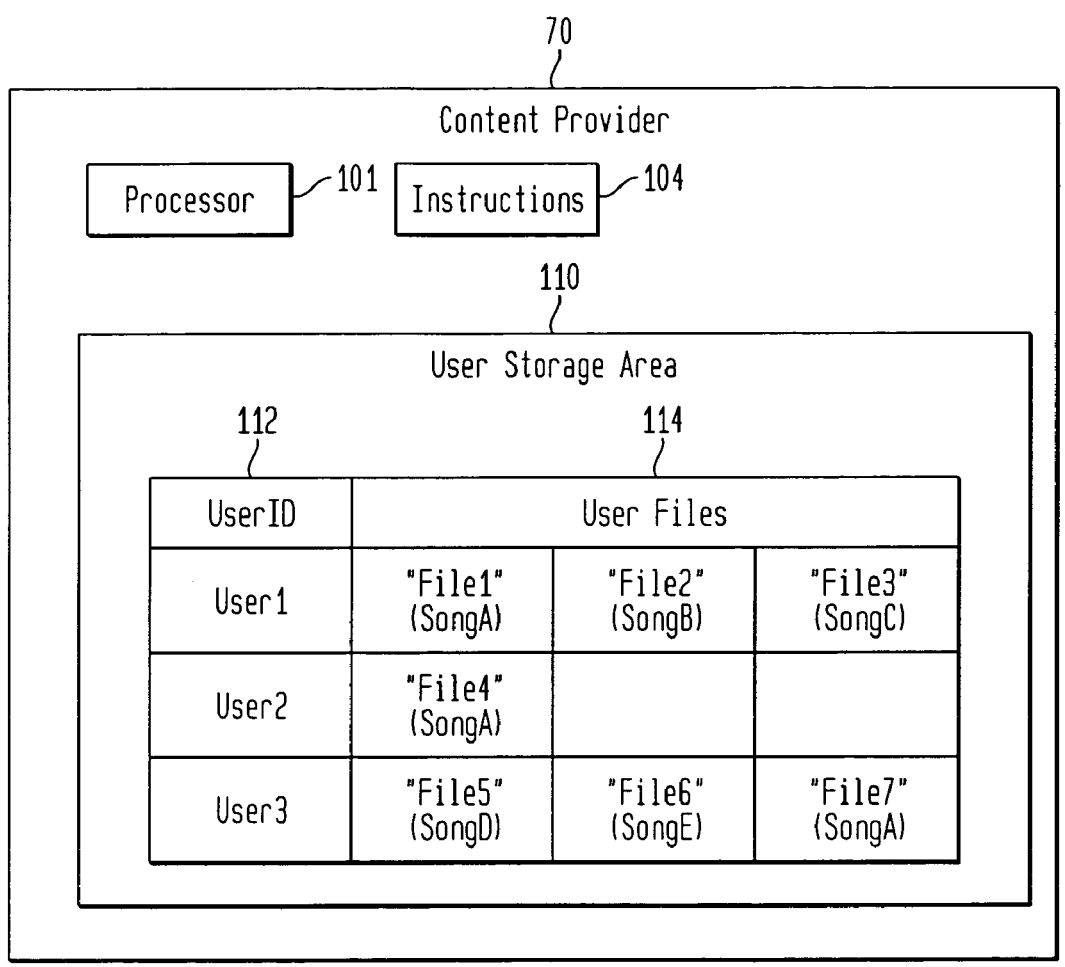
FIG. 2 is a functional diagram of a content provider in accordance with an embodiment of the invention.

As shown in greater detail in FIG. 2, web server 70 functions as a content store and contains a processor 102, a set of instructions 104 which are executed by processor 102 and data such as user storage area 110. The functions, methods and routines of the program are explained in more detail below. Although the data is shown separately from the instructions, the data may be modified by the processor during execution of the instructions. Moreover, both the data and the instructions may be stored as a program on the hard disk of the server 70.

User storage area 110 is used to store the user music files 114 uploaded by the users. Preferably, each user has a predefined amount of space allocated to its sole use, and no other user is permitted unauthorized access to any information stored in its particular space. Each user has a User ID 112 which identifies the space allocated to the user. For illustration purposes, three different user spaces are schematically shown in FIG. 2 for users with ID's "User1", "User2" and "User3". User1 has three music files stored in its space, including files called "File1", "File2" and "File3" corresponding with songs named "SongA", "SongB" and "SongC", respectively. User2 also has a file stored in its space designated as "File4". However, as indicated by the "SongA" label in parenthesis next to "File4", that file may be the same song as—and byte for byte a copy of—"SongA" contained in File1, of User1. File1 and File4 may also be quite different even if the song is the same, such as if the same song was encoded at two different frequencies. FIG. 2 also shows User3 as having three music files, "File5", "File6" and "File7" corresponding with "SongD", "SongE" and "SongA" (again), respectively.

Figure 3:
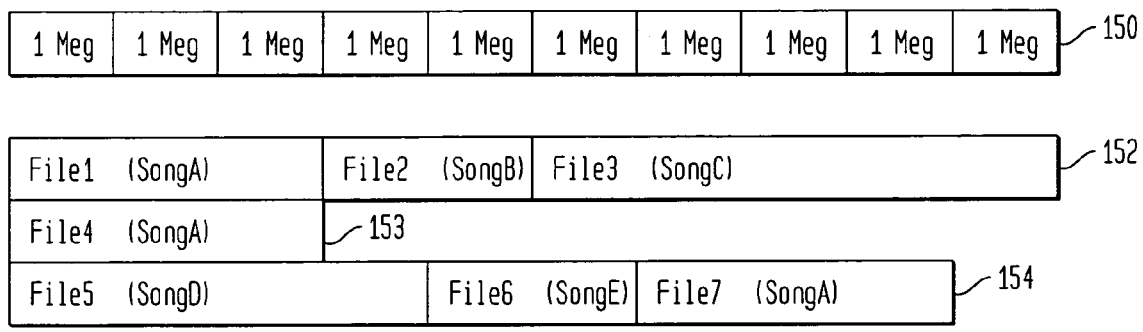
FIG. 3 is an example of memory allocation in accordance with an embodiment of the invention.

The manner in which songs are stored and occupy user storage area 100 is also shown schematically and to scale in FIG. 3. In the diagram, the width of a cell relates to the size of the associated file. The width of each cell in row 150 relates to 1 MB of data. As can be seen, assuming that each user has stored the exact same copy of the SongA music file, the music file will take up the same amount of space in each individual user's space 152-54. If desirable, the system may limit each user to a particular amount of storage space, such as 100 megabytes of music.

Figure 4A:
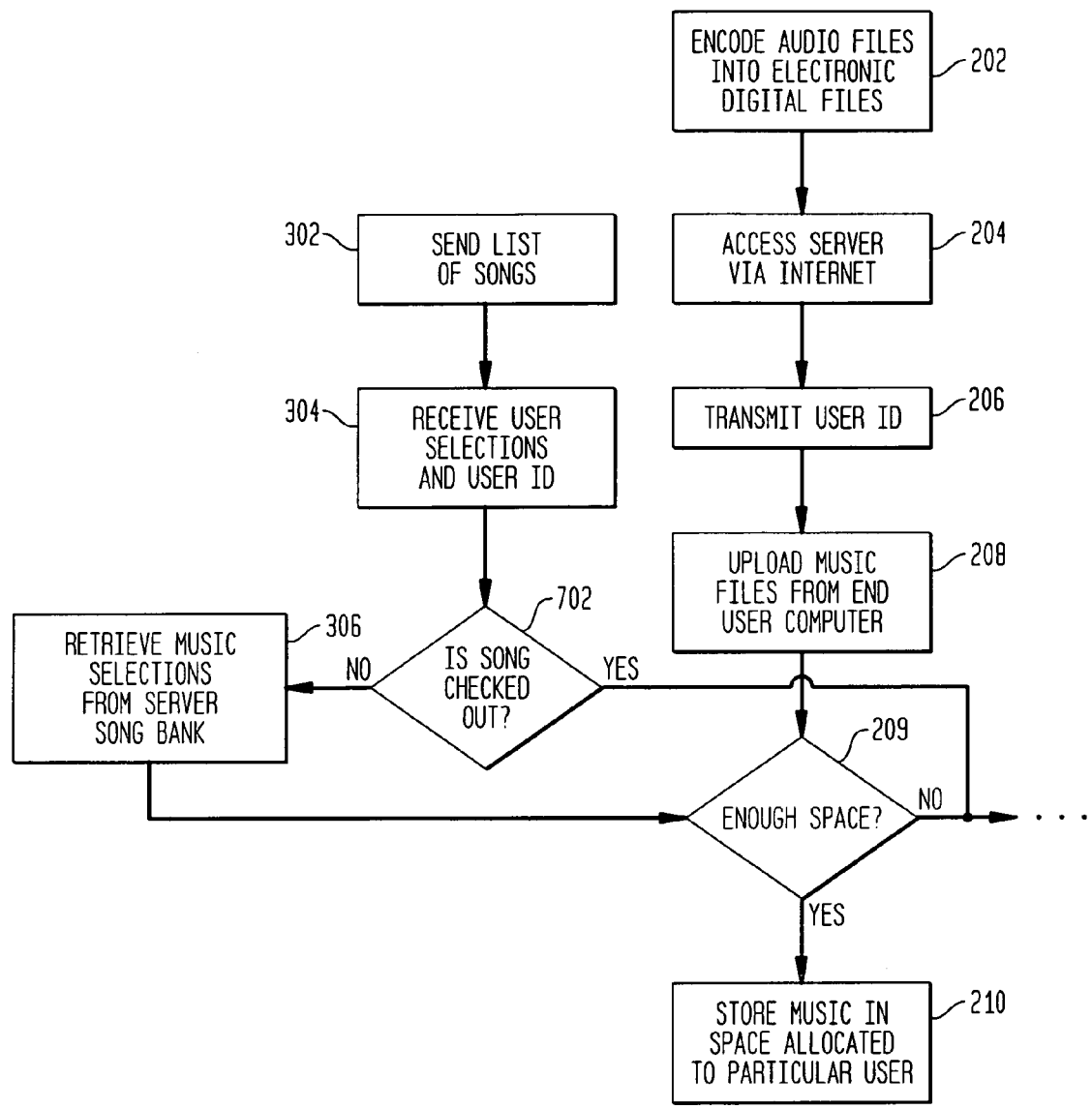
FIG. 4 is a flow chart of operations in accordance with an embodiment of the invention.
Figure 4B:
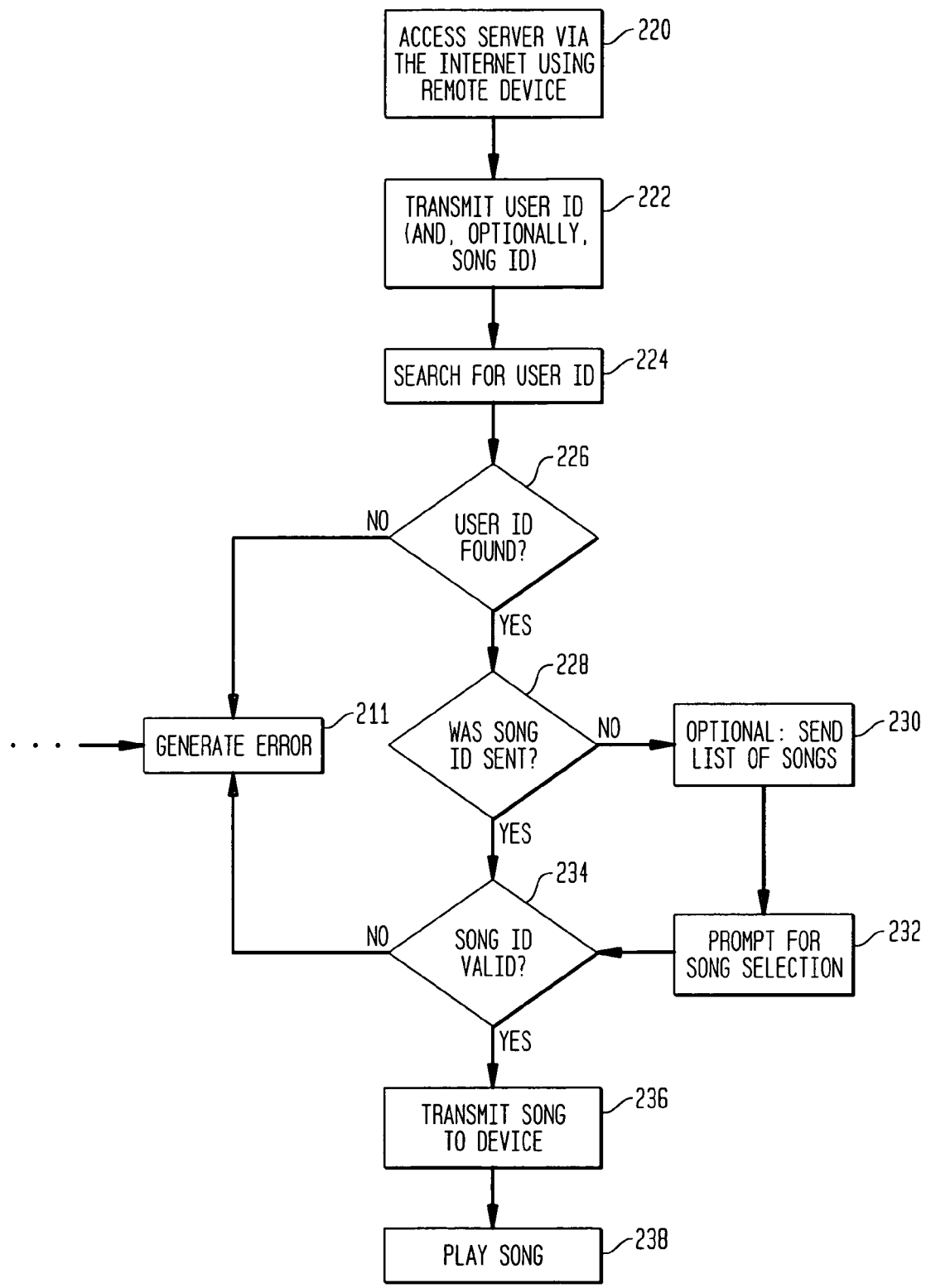

In operation in accordance with one embodiment, music is stored on the server in accordance with the steps shown in the flowchart of FIG. 4. First, the user encodes audio compact discs from red book format or an analog source into electronic digital files (step 202). The files are preferably compatible with MPEG-3 format or Sony's ATRAC3 format and are encoded with a general purpose computer, such as computer 60, or a dedicated device. The user then causes end user computer 60 to access the content server 70 via the Internet 80 (such as by logging onto a web page) (step 204), supplies its User ID 112 (step 206) and then uploads the files to the content server 70 (step 208). Using the foregoing example of FIG. 2, User1 would take a compact disc it owned, encode "SongA" as a digital file on end user computer 60 and upload the digital file to the content server 70 via Internet 80. In so doing, the user identifies the song with a string, such as "File1".

Upon receipt of the User ID 112 and the song file, processor 101 of server 70 in accordance with instructions 104 first checks the size of the file to make sure that the user has not exceeded its space limit (step 209). If the user has, then an error notification will be sent to the user explaining the problem (step 211). Otherwise, processor 101 will store the uploaded file into the space allocated for the particular user (step 210), and associate the file with the identifying string provided by the user.

The operation of downloading the music is also shown in FIG. 4. In this embodiment, the user accesses the content server 70 (such as by logging onto a web page) via PDA 73 which, for the purposes of this example, shall be considered to be at a geographic location remote from end user computer 60 (step 220). In other words, although the user uploaded the songs with one device, the user may download the songs at a different location with a different device. The user accesses the web site maintained by content server 70 by using wireless modem 76 in a manner well known to those of ordinary skill in the art. The user next supplies its User ID to content server 70 by entering the information on a web page displayed on screen 75 (step 222). For example, the user may identify itself as "User1" (it is recommended, but not required, that user names be more arbitrary than a designation of "User1" for security reasons). Optionally, the song may be identified at the same time as well. Processor 101 of server 70 searches user storage area 110 to see whether there is any user associated with that particular ID (steps 224 and 226). If the user ID is not found, an error notification is sent to the user to that effect (step 211).

If the user ID is found, the server 70 checks whether it has already been provided with an identification of the song to be downloaded (step 228). If not, then server 70 may, optionally, send a list of the identifying strings to the user (step 230). For example, server 70 would send the strings "File1", "File2" and "File3" if the songs matched the illustrative examples in FIG. 2. These strings could be displayed on screen 75. Content server 70 next prompts the user to enter the identifier for the song, which may be entered via touch-screen 75 (step 232).

The identifier for the song is checked against the list of songs associated with that user (step 234). Using the example values of FIG. 2, the string "File1" would be valid identifier because there is a song file having that identifier contained in User1's space. The string "File4", on the other hand, would not be a valid identifier even though it points to a byte-for-byte identical file with the same name in User2's space. Accordingly, the identifier must identify a song contained in the respective user's space. If the song with that identifier is not contained in the space allocated to that user in user storage user 110, the user is notified of the error (step 211).

If the song is validly identified, the song is then sent from the server 70 to the PDA 73 (step 236). Once downloaded, the song may then be played by the user (step 240).

Accordingly, each user is assigned a unique identification code such that the user (or the entity to whom the user gives the code) is the only entity that can upload and download music to and from the storage space allocated to the user. This identification code is sent with, or before, the steps of uploading and downloading and is used to verify that the requester is the user associated with the particular storage space. It is not necessary for the server to set aside, in advance, actual portions of the storage space to particular users. Rather, the files may be first stored (and thus occupy a portion of the hard drive of the server) and access permissions set for the file set in accordance with the identify of the user.

After the music is uploaded by the user to the central location, it may be played anywhere by any device capable of connecting with the server. For example, if the online service provider hosts a website, the user provides its unique identification code and the online service provider authenticates the user. The user may then download, via the internet, a copy of one or more of the music files that had been uploaded by the user.

Rather than downloading the music, the music may also be streamed to the user. Security choices may dictate whether the music file is served via a streaming process or a download, as streaming places more of a requirement on the connection but downloads place more of a resource requirement on the device. For the purposes of this disclosure, the word "download" should be understood to include real-time streaming regardless of whether the transmitted information may be permanently and locally stored.

One of the advantages of the system is that there is a copy of a song for every user, rather than giving one copy of a song to multiple users. Moreover, the user is responsible for maintaining the songs stored in their space. Thus, the invention facilitates respect for copyright owner's rights to prevent multiple unauthorized parties from downloading the same song.

Preferably, the system provides music to dedicated devices by automatically authenticating the devices upon connection. In such an embodiment, each device that accesses songs stored in content server 70 has an identifier which is unique to the system. For example, such an identifier may be a GUID. The unique identifier may also be a number stored in the RAM or other readable/writable storage media of the device, such as RAM 79 of PDA 73. This information may be stored in the user storage area of content server 70 as shown in FIG. 7. For each User ID 612 in the user storage area, there are not only songs 614 but also a list of device identifiers 616. For example, the identifier "Device1" may be the value of the device identifier stored in a network-enabled Walkman® player operated by User1, "Device2" may be the value of the device identifier stored in the car audio system 72 operated by the same User1, "Device3" may be the value of the device identifier stored in end user computer 60 operated by User1, and "Device4" may be the value of the device identifier stored in a Clie™ PDA operated by User1.

In one possible operation of such a system, the device connects with the content server via the Internet (FIG. 4; step 250). The device automatically transmits its unique identifier (step 252). In response, the processor of the content server searches the device identifiers 616 to determine the associated user ID (step 254). If a user ID is found, then the process proceeds as described above.

Preferably, the system also has the ability to limit the number of songs that a consumer can download or stream to, either simultaneously or in total. In such an embodiment and as shown in FIG. 6, each content server 70 counts how many times a file has been downloaded. The processor also decrements that value each time it is downloaded. For example, if a device designated as "Device1" was given a trial period to listen to Song A, then content server 70 may store the value "5" in the Copies Left field 513 of the user storage area, thus indicating that the device may download the song 5 times. Each time the song is downloaded, the value decrements. For example, FIG. 6 shows that "Device2" may only download the song 3 more times. However, if SongA were purchased, then the device would be able to download the song any number of times (such as is shown for "Device3").

Limiting the authorization to a particular device or user has its own unique advantages. If the authorization is limited to a particular user ID, which is not wedded to a particular device, then a user may grant access to friends and associates by passing along his or her ID. On the other hand, if a more secure environment is required, then the device ID may be hardwired into the unit, such as GUID. Preferably, the content server 70 will allow both possibilities. Thus, certain songs, such as sound clips, may be freely transferable provided you have a particular user ID. Different songs, on the other hand, would be limited to a specific number of plays on a particular device. Access can thus be limited to particular devices or could provide the user with full "owner" access.

Figure 5:
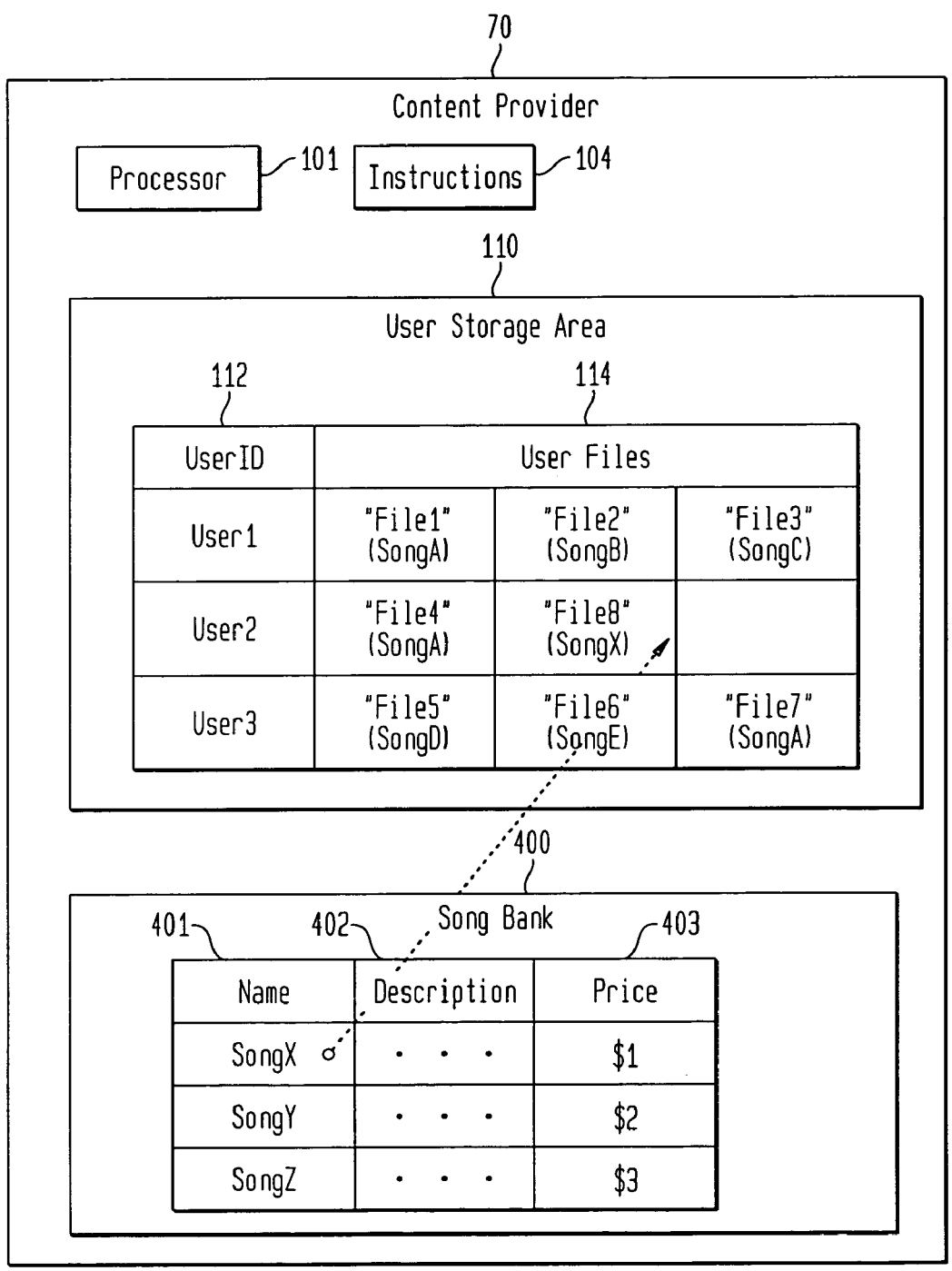
FIG. 5 is a functional diagram of another content provider in accordance with an embodiment of the invention.

In another embodiment, the user does not encode and upload the song themselves. Rather, the user buys a copy of the music from the content server 70 and the file is stored in the user's space. Specifically, as shown in FIG. 5, content server 70 includes a database of music selection. This database, song bank 400, stores a plurality of songs as music files. The songs are designated by name 401, a description 402 and the price of the song 403.

In the operation of this embodiment, the user will access the content server and obtain a list of music selections which are available for use (step 302 of FIG. 4). For example, a list of the songs, their descriptions and prices may be sent as a web page to end user computer 60. The user selects the songs that they would like and then transmits that information, along with their User ID, to the content server 70 (step 304). For example, "User 2" may indicate that they wish to listen to "Song X". Upon receiving the name of the song from the user, processor 101 then extracts the file associated with the song from the song bank 400 (step 306). The process then proceeds as if the song had been uploaded by the user, i.e. the processor 101 checks the size of the selected song against the space remaining available to the user (step 209). If there is enough room, the song is stored in the area allocated to the particular user (step 210) as schematically indicated by the dashed arrow in FIG. 5. Accordingly, in this embodiment, even when a copy of the song is available on the server, yet another copy of the song will be stored in the user's space in user storage area 110. The database may also be contained at a separate site or server, such as server 71 of FIG. 1.

The embodiment shown in FIG. 2 permits other interesting options and variations. For example, the system may deploy a security system such as those currently being contemplated by the music industry for online use such as SDMI. The user may be able to "check" particular songs in and out of song bank 400. If one user has loaded the song onto its system, then no other user would be permitted to listen to the song, thus preventing multiple parties from simultaneously playing or using the same song. Such an embodiment may be implemented as shown by step 702 of FIG. 4, whereby a song may only be uploaded into a user's space if it is not checked out to someone else. The song could be checked back in in any number of different ways, such as the user simply informing the content server that it has finished listening to the song or counting the number of streaming downloads (as discussed in connection with FIG. 6) and checking it back in when the Copies Left field 513 reaches zero. In other words, the system is geared to prevent unauthorized multiple copies of a single authorized copy. This helps prevent piracy and the inappropriate use of the music collection stored on the network.

Another one of the myriad advantages of the present invention is that users are able to access music from any location without having to carry media containing the music. A user may place a copy of its music at a central location and play that music from any remote location. Another advantage is that the authentication mechanism protects third party's rights in the user's music but still preserves the foregoing advantage of portability. Moreover, by providing a unique storage area at a central location, the user can access the music regardless of whether or not the device used to encode or upload the music is powered on or not. In other words, the consumer may upload their entire music collection to a system server operated as an independent service and will then be able to access the entire collection from anywhere in the world, from any device connected to the Internet and equipped with audio-enabled and browser technology. The rapidly advancing availability of wired and wireless Internet connectivity means a music-loving consumer can readily access their entire collection from any place they can connect.

Another advantage of the invention is that it can accommodate security requirements. For example, the central server may also check music for security limitations before permitting the music file to be stored.

Additionally, because the user is able to upload the music they want, the user can create unique compilations in accordance with the user's personal preferences. The user can thus create compilations directed to particular genres of music (such as dance or exercise). Optionally, the user may also change the order that the songs are downloaded or streamed.

In another implementation, the first time the consumer plays a new CD they are adding to their collection, their Internet connected CD player or changer would upload the file to the network server for storage. This upload process could be implemented in variety of ways including the disc-by-disc upload from the CD-ROM drive of a PC connected to the Internet or from a new service-based business designed to transfer the consumer's collection in total. The file format used could be any of the known or to be developed formats given file size, sound quality, and security trade-offs.

In addition, because the network is functioning as the storage facility for the consumer's audio collection, the network could employ preference mining techniques as to the collection's content and frequency of use as well as device context. Such data mining would enable the network to actually recommend selections from the collection to match particular activities or to suggest new music which might be enjoyed by the same consumer.

Unless stated to the contrary, use of the words such as "including," "containing," "comprising" and the like, means "including without limitation" and shall not be construed to limit any general statement that it follows to the specific or similar items or matters immediately following it.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of storing audio files comprises:
   (a) receiving at a central location electronic files representing audio signals from a first device,
   (b) associating the audio files with authentication identification information of a user,
   (c) storing said audio files at said central location on at least a portion of a storage media, said portion uniquely associated with said authentication identification information,
   (d) receiving at said central location said authentication identification information from a second device,
   (e) transmitting said audio files to said second device upon receipt of said authentication identification information.

2. The method of claim 1 wherein said server is a web server and said files and information are received and transmitted via the Internet.

3. The method of claim 1 wherein at least one of said devices is a general purpose computer.

4. The method of claim 3 wherein at least one of said devices is a personal computer.

5. The method of claim 1 wherein said second device is installed in an automobile.

6. The method of claim 1 wherein at least one of said devices is a personal digital assistant.

7. The method of claim 6 wherein said personal digital assistant receives said audio files via wireless communication.

8. The method of claim 1 further comprising encoding said electronic files from a source of audio information.

9. The method of claim 8 wherein said source is a compact disk.

10. The method claim 1 wherein said electronic files are compatible with the MPEG format when received at said central location.

11. The method claim 1 wherein said electronic files are compatible with the ATRAC3 format when received at said central location.

12. The method of claim 1 further comprising receiving said authentication identification information from said first device.

13. The method of claim 1 wherein said step of receiving at said central location said authentication identification information comprises said second device automatically sending said authentication identification information to said central location.

14. The method of claim 12 or 13 wherein said authentication identification information is associated with said device.

15. The method of claim 14 wherein said first device and said second device are the same device.

16. The method of claim 15 wherein said step of associating said audio files with identification information comprises a user sending information which identifies the user.

17. The method of claim 1 wherein said identification information is sent from said first device when said first device is connected to said central location via a network.

18. The method of claim 17 wherein said network is the Internet.

19. The method of claim 18 wherein said authentication identification information is sent automatically by said first and second devices to said central location.

20. The method of claim 1 further comprising the step of receiving at said central location a request for at least one of said files and wherein said step of transmitting comprises transmitting said at least one of said files.

21. The method of claim 20 further comprising the step of comparing the identification information associated with said requested file with the identification information received during said step of receiving said identification information from said second device, and said step of transmitting is conditional upon the results of said comparison.

22. The method of claim 21 further comprising the step of transmitting to said second device a list of the files associated with the identification information received from said second device.

23. The method of claim 22 further comprising comparing the size of the electronic file with the amount of said portion uniquely associated with said identification information, and wherein performance of said step of storing is conditional upon the result of such comparison.

24. The method of claim 23 further comprising transmitting a notification to the user if the size of the electronic file plus the size of other files stored in said portion is greater than the amount of said portion.

25. The method of claim 1 wherein said second device is at a geographic location remote from said first device.

26. The method of claim 1 wherein said step of transmitting comprises downloading said file.

27. The method of claim 26 wherein said step of transmitting comprises streaming said file to said second device.

28. The method of claim 26 wherein said step of transmitting comprises permitting said second device to permanently store said file.

29. The method of claim 1 further comprising:
(a) receiving at said central location electronic files representing audio signals from a third device, said third device having different identification information,
(b) storing the audio files from said third device on a portion of said storage media that is different from the portion uniquely associated with said identification information associated with said audio files from said first device.

30. The method of claim 1 wherein the authentication identification information comprises a GUID.

31. The method of claim 1 wherein the central location is configured to permit concurrent submission of the authentication identification information of the user and audio file identification information by the second device.

32. A system for storing and transmitting audio information comprising:
a processor;
memory;
data stored in said memory, said data identifying a plurality of users or devices, said data further comprising a plurality of files associated with audio information, each said file being uniquely associated with the identity of a single user or device;
a set of instructions executable by said processor, said instructions conditioning the transmission of a song from the system to a user or device based on the identity of the user or device associated with said audio information.

33. The system of claim 32 wherein the total size of files stored in said data for a particular user or device is limited.

34. The system of claim 33 wherein a file associated with a first user is identical to a file associated with a second user and said data comprises two copies of said file.

35. The system of claim 32 wherein said system comprises a server.

36. The system of claim 35 further comprising an audio player connected via a network to said server, said audio player being identified by at least some of the data identifying a plurality of users or devices.

37. The system of claim 36 wherein said audio player comprises memory containing information identifying said player.

38. The system of claim 37 wherein said audio player further comprises a speaker and a processor for playing said file.

39. The system of claim 37 wherein said audio player sends the identification information automatically to said server.

40. The system of claim 37 wherein said remote device is a PDA.

41. The system of claim 37 wherein the identification information comprises a GUID.

42. The system of claim 32 wherein said identification information comprises a portable audio player.

43. The system of claim 32 wherein the set of instructions executable by said processor permit concurrent submission of the identity of the user and a song identification as a condition of the transmission of the song.

44. A method of storing and transmitting songs comprising:
uniquely associating a portion of the storage space on a server with a user or device, the storage space to store song files each having a filename;
associating said portion with a first user authentication identifier;
receiving said first user authentication identifier;
receiving a song file representative of a song; and
storing said song file with a filename in the portion of said storage space associated with said first user authentication identifier;
receiving a second authentication identifier and a request for said song file;
comparing said second authentication identifier with the first user authentication identifier associated with said requested song file;
transmitting said song file in response to said request depending upon the outcome of said step of comparing.

45. The method of claim 44 wherein if a first file is received along with a first identifier and a second file is received along with a second identifier and said first file and second file are identical copies of one another, then said first file is stored on a portion of said storage space different from the portion where said second file is stored.

46. The method of claim 45 further comprising the step of tracking the number of times a song file has been transmitted.

47. The method of claim 44 wherein said step of storing said song file in the portion of said storage space associated with said first identifier occurs prior to said step of associating said portion with a first identifier.

48. The method of claim 44 wherein said step of receiving said song file comprises receiving said song file from said user.

49. The method of claim 44 wherein said step of receiving said song file comprises receiving said song file from a bank of song files.

50. The method of claim 49 further comprising the step of said song bank preventing access to said song file stored at said song bank for an amount of time.

51. The method of claim 50 wherein said amount of time is determined by the number of times a user is permitted to download the song.

52. The method of claim 44 further comprising receiving concurrent information in a request, the concurrent information comprising a request for a particular song file representative of a song and said first user authentication identifier; and transmitting the song file upon authenticating the request with the first user authentication identifier.

53. A method for storing audio files for use by multiple users to prevent access to an authorized user's audio files by other authorized users comprising:
(a) receiving at a central system a plurality of electronic files representing audio signals for the purpose of storing the plurality of files at the central system for multiple users,
(b) storing a plurality of sets of electronic files of the plurality of audio files at the central system, each set being uniquely associated with authentication identification information of a user,
(c) receiving at said central location authentication identification information of a user from a device, and (d) transmitting audio files of a set of audio files to said device upon receipt of said authentication identification information of the user;

wherein different stored sets of electronic files of the plurality of audio files on the central system are exclusively accessible to different authentication identification information.

54. A method for storing audio files for use by multiple users to prevent access to an authorized user's audio files by other authorized users comprising:

(a) receiving at a central system a plurality of electronic files representing audio signals for the purpose of storing the plurality of files at the central system for multiple users, (b) storing a plurality of sets of electronic files of the plurality of audio files at the central system, each set being uniquely associated with authentication identification information of a user, (c) receiving at said central location authentication identification information of a user from a device, and (d) transmitting audio files of a set of audio files to said device upon receipt of said authentication identification information of the user;

wherein different stored sets of electronic files of the plurality of audio files on the central system are exclusively accessible to different authentication identification information, wherein the central location is configured to permit concurrent submission of the authentication identification information of the user and audio file identification information from the device for transmitting at least one of the audio files to the device, without first transmitting a song selection list to the device.

* * * * *